Patented Nov. 13, 1951

2,574,955

UNITED STATES PATENT OFFICE 2,574,955

ESTERIFIED ALKYLOLAMINE SALTS OF ACID ESTERS OF PHOSPHORUS ACIDS

John W. Bishop, Plainfield, N. J., assignor to Tide Water Associated Oil Company, Bayonne, N. J., a corporation of Delaware No Drawing. Application July 14, 1948,
Serial No. 38,743

15 Claims. (Cl. 260—403)

The present invention relates to a novel group of chemical compounds and to the preparation thereof. More particularly, the invention relates to a novel group of addition compounds that are useful for many purposes and, especially, for application to the surfaces of ferrous metals to prevent rusting thereof upon exposure to severe rust-inducing conditions.

Generally speaking, the novel compounds embodied herein comprise salts formed by addition reaction between acid esters of phosphorus acids and amines containing an alkylol group esterified with an organic acid. In the formation of such salts, it appears that the addition is effected at the nitrogen atom of the amine by transference thereto of an acidic hydrogen of the acid ester and formation of a bond between the nitrogen atom and the oxygen atom from the hydroxyl group containing the aforesaid hydrogen atom in the acid ester, the acid ester and the amine nucleus otherwise remaining intact. In addition to the novel compounds per se, the invention embodies such compounds in combination with a free acid ester of a phosphorus acid, the presence of the free acid ester in such a combination being especially desirable when the novel compounds of this invention are contemplated for use in prevention of rusting of ferrous metals under extremely severe rust-inducing conditions.

In accordance with this invention, the acid esters that may be employed for preparation of the novel compounds may broadly be defined as esters of phosphorus acids that contain at least one acidic hydrogen, i. e., partially esterified phosphorus acids. For purposes of illustration, examples thereof include partially esterified compounds such as the mono- and di-esters of orthophosphoric acid, and mixtures of such esters. More specifically, the invention contemplates use of esters such as the aliphatic, alicyclic, and aryl acid esters of orthophosphoric acid and still more specifically, acid esters of phosphorus acids that contain, as the residue of an esterifying alcohol, a hydrocarbon group containing a relatively large number of carbon atoms, as for example, from about 4 to about 30 carbon atoms. Illustrative of acid esters falling within the more preferred embodiments are the aliphatic acid esters, such as may be illustrated by the 2-ethylhexyl acid phosphates, octyl acid phosphates, lauryl acid phosphates, mixtures of such aliphatic acid esters, alicyclic acid esters such as the cyclohexyl acid phosphates, e. g. monocyclohexyl and di-cyclohexyl acid phosphates, aryl and aliphatic-substituted aryl acid esters, such as cardanyl acid phosphates, and the like.

With reference to the esterified alkylol amine component of the novel compounds as embodied herein, the invention contemplates use of primary, secondary and tertiary amines characterized by containing at least one esterified alkylol group. For purposes of illustration, such amines include esterified primary alkylol amines, e. g. esterified monoethanol amine, secondary amines that contain at least one alkylol group, e. g. diethanol amine, having at least one of the alkylol groups esterified, and tertiary amines containing one to three alkylol groups that have at least one of the alkylol groups esterified with a suitable organic acid. Illustrations of such tertiary amines include diethyl ethanol amine, triethanol amine, dimethyl ethanol amine, and the like. In preferred embodiment, the invention contemplates use of amines that contain an alkylol group esterified with an aliphatic acid containing a relatively long hydrocarbon chain, as for example, alkylol amines esterified with organic acids of the fatty acid series and more particularly, such acids that contain a hydrocarbon chain of about 4 to about 30 carbon atoms. More specific illustrations of such amines include beta (N-dimethyl) aminoethyloleate, beta (N-diethyl) aminoethylstearate, beta (N-diethyl) aminoethyloleate, beta (N-ethanol) aminodiethyloleate, beta aminoethyloleate, and the like. Such esterified alkylol amines, and methods of preparation thereof, are known to those skilled in the art, and hence it is not deemed necessary to include herein a detailed description for preparation thereof.

In order to further illustrate the invention, without intending that the invention be limited thereto, the following examples are set forth:

*Example I*

A composition was prepared by blending, while stirring, equivalent weights of dioctyl acid phosphate and beta (N-diethyl) aminoethylstearate. The initial temperature of each reactant was 28.5° C. Reaction between the acid ester and the amine proceeded with evolution of heat and reached completion rapidly, the temperature of the reacting composition reaching a maximum of 48° C. On cooling to room temperature (70° F), the reacted mixture was a homogeneous dark-colored mass having a viscosity of 588 Saybolt Universal seconds at 100° F., i. e., a viscosity about 6 times greater than the theoretical viscosity of 98 S. U. S. at 100° F. calculated on the basis of additivity of the aforesaid individual reactants in the proportions employed.

Example II

A composition was prepared by mixing, while stirring, equivalent weights of dioctyl acid phosphate and beta (N-diethyl) aminoethyloleate, the initial temperature of the reactants being 28° C. Reaction between the acid ester and the amine proceeded with evolution of heat and reached completion rapidly, the temperature of the reacting mixture reaching a maximum of 46° C. Upon cooling to room temperature, the reacted mass was a homogeneous dark-colored product having a viscosity of 520 S. U. S. at 100° F., i. e., about 5.7 times greater than the theoretical viscosity of 92 S. U. S. calculated on the basis of additivity of the aforesaid reactants in the proportions employed.

Example III

A composition was prepared by mixing, while stirring, equivalent weights of dioctyl acid phosphate and beta (N-dimethyl) aminoethyloleate, the initial temperature of the reactants being 28° C. Reaction between the acid ester and the amine proceeded with evolution of heat and reached completion rapidly, the reacting mixture reaching a maximum temperature of 47° C. Upon allowing the reacted mixture to cool to room temperature, a homogeneous dark-colored viscous mass was obtained having a viscosity of 803 S. U. S. at 100° F., i. e., about 5.9 times greater than the calculated viscosity of 137 S. U. S. on the basis of additivity of the individual reactants in the proportions employed.

Example IV

A composition was prepared by mixing together, with stirring, equivalent weights of beta (N-dimethyl) aminoethyloleate and a mixture of monolauryl- and dilauryl-acid phosphate containing by weight about one part of monolauryl- to two parts of dilauryl-acid phosphate. The initial temperature of the reactants was 31° C. Reaction between the acid esters and amine proceeded with evolution of heat and reached completion rapidly, the reacting mixture reaching a maximum temperature of 53° C. Upon cooling to room temperature, the reaction product was a homogeneous dark-colored mass having a viscosity of 2058 S. U. S. at 100° F., i. e., about 9.9 times greater than the theoretical viscosity of 208 S. U. S. calculated on the basis of aditivity of the individual reactants in the proportions employed.

Example V

A composition was prepared by mixing together, while stirring, equivalent weights of beta (N-diethyl) aminoethyloleate and lauryl acid phosphates as described in Example IV. The initial temperature of the reactants was 30° C. Reaction between the acid esters and amine proceeded with evolution of heat and reached completion rapidly, the reaction mixture reaching a maximum temperature of 57° C. Upon cooling to room temperature, a homogeneous dark-colored viscous mass was obtained having a viscosity of 2903 S. U. S. at 100° F. which was 20.7 times as great as the theoretical viscosity of 140 S. U. S. at 100° F. calculated on the basis of additivity of the individual reactants in the proportions employed.

Example VI

A composition was prepared by blending, with stirring, equivalent weights of dicyclohexyl acid phosphate and beta (N-diethyl) aminoethyloleate. The reaction between the acid ester and the amine reached completion rapidly with an increase in temperature, and upon cooling to room temperature, the reaction product was a viscous, homogeneous, amber-colored mass having a smooth, salve-like texture.

Example VII

A composition was prepared by mixing together, while stirring, equivalent weights of beta (N-diethyl) aminoethylstearate and lauryl acid phosphates as described in Example IV. The initial temperature of the reactants was 30° C. Reaction between the acid esters and the amine proceeded with evolution of heat and reached completion rapidly, the reacting mixture reaching a maximum temperature of 49° C. Upon cooling to room temperature, a homogeneous dark-colored viscous mass was obtained having a viscosity of 3354 S. U. S. at 100° F. which was about 23 times as great as the theoretical viscosity of 146 S. U. S. calculated on the basis of additivity of the individual reactants in the proportions employed.

Example VIII

A composition was prepared by blending, with stirring, equivalent weights of monocardanyl dihydrogen phosphate and beta (N-diethyl) aminoethyloleate. The reaction between the acid ester and the amine reached completion rapidly, the temperature of the reacting mass rising from 27° C. to 36° C. The reacted composition, on cooling to room temperature, was a highly viscous, homogeneous, amber-colored product.

Example IX

A composition was prepared by blending, with stirring, monocardanyl dihydrogen phosphate and beta (N-diethyl) aminoethyloleate in the ratio of two equivalent weights of the acid ester to one equivalent weight of the amine. As in Example VIII, the temperature rose, until completion of the reaction, from 23° C. to 36° C. The reacted composition, upon cooling to room temperature, was a viscous, homogeneous, amber-colored product.

As aforesaid, the present invention embodies, in addition to the novel substituted ammonium salts per se, compositions comprising such salts in combination with a free acid ester of a phosphorus acid. Such compositions may, for example, comprise in mole ratio about one part of neutral salt, formed by an acid ester of a phosphorus acid with an esterified alkylol amine, to about 0.05 to about three parts, and more preferably, to about 0.1 to one part, of an acid ester of a phosphorus acid. Such combination compositions may be prepared by blending the substituted ammonium salts as embodied herein with an acid ester of a phosphorus acid, or if desired, such combination compositions may be prepared by reacting a suitable esterified alkylol amine with an acid ester of a phosphorus acid employing the acid ester in an amount in excess of that required to convert the amine into substituted ammonium salts. In illustration of such combination compositions and a suitable method for preparation thereof and without intending that the invention be limited thereto, the following examples are set forth. In each of the following examples, upon mixing of the amine and the acid ester an exothermic reaction occurred to produce dark-colored viscous substances. As in each case, the phosphate ester was employed in an amount in excess of the amount required for neutralization by the amine, the product of each reaction was the addition salt of the amine with the acid ester in combination with the free acid ester.

| | Reactants | Proportion of Reactants on Basis of Equivalent Weights Amine: Acid Ester |
|---|---|---|
| 1 | B (N-diethyl) aminoethylstearate, Lauryl Acid Phosphates | 1:1.5 |
| 2 | ..do.. | 1:1.5 |
| 3 | ..do.. | 1:1.25 |
| 4 | ..do.. | 1:1.13 |
| 5 | B (N-ethanol) amino-di(ethyloleate), Lauryl Acid Phosphates | 1:1.14 |
| 6 | B (N-diethyl) aminoethyloleate, Lauryl Acid Phosphates | 1:1.14 |

The novel salts embodied herein are useful for many purposes and particularly for applying to the surfaces of ferrous metals for protection thereof against rusting upon exposure to rust-inducive conditions. For such purposes, the novel compositions may be employed per se, or in mixture with one or more of such salts, or as a solution of the salt in a suitable solvent vehicle, as for example, in mineral oils, in fractions of mineral oils, such as naphtha, or in solution with liquid solvents for such salts that are other than hydrocarbons and which do not deleteriously enhance rusting of metals. Such compositions, containing the novel compounds as embodied herein in combination with a solvent vehicle therefor, are disclosed in my copending application Serial No. 775,755, filed September 23, 1947. When applied to metals as coatings for protection thereof against rusting, the novel compounds of this invention provide protection to a degree unexpected for salts of this type and, when such salts are used in combination with free acid esters of phosphorus acids, the degree of protection is not only markedly increased but is considerably more than the degree of protection based on additivity, that would be expected from the results obtained by individual use of the acid ester or the esterified alkylol amine. In order to illustrate the effectiveness of the compounds as embodied herein for such usage, the following examples are set forth showing the results obtained by subjecting the novel salts, as well as combinations thereof with free acid esters of phosphorus acids, to the humidity corrosion test described in "Army-Navy Aeronautical Specification Compound; Corrosion-Preventive, Aircraft engine, AN-VV-C-576B." Briefly, the test comprises coating freshly sand blasted steel panels with the test composition, draining for at least four hours in an atmosphere of 50 to 55% relative humidity at 25° C., and then subjecting the panels to a circulating atmosphere of 95 to 100% relative humidity at 120° F. for 150 hours. The presence of any corrosion of the panels especially within ⅛" from any edge evidences failure of the test composition.

*Example A*

A composition was prepared by dissolving in a mineral oil of SAE 30 grade, 4% by weight of the addition product prepared by reacting equivalent weights of beta (N-diethyl) aminoethylstearate with lauryl acid phosphates. When subjected to the aforesaid humidity test, the humidity cabinet life obtained was at least 200 hours. For purposes of comparison, and to illustrate the unexpectedly high degree of rust-preventive characteristics provided by such salts, compositions were prepared by dissolving 3 to 5% of the lauryl acid phosphates in a mineral oil of SAE 30 grade, and another composition was prepared by dissolving in such an oil 4% by weight of beta (N-diethyl) aminoethylstearate. These compositions, containing only the esterified alkylol amine or only the acid ester, when subjected to the aforesaid humidity cabinet test, did not provide as highly effective rust-inhibiting characteristics as the salt of such compounds, as the maximum life in hours obtained by individual use of either component of the salt was about 150 hours. Hence, as evidenced by the aforesaid, use of the salt obtained by reacting the acid ester with the esterified alkylol amine provided, under conditions of the aforesaid test, an increase of at least 33% over and above the additive test life obtained by individual use of either one of the two components used in preparing the salt.

*Example B*

A composition was prepared by reacting beta (N-diethyl) aminoethylstearate with lauryl acid phosphates in a ratio, based on equivalent weights, of 1 part of amine to 1.5 parts of the acid esters providing a composition comprising free acid ester in solution with the acid ester salt of the amine. 0.83% by weight of the composition was dissolved in a mineral oil of SAE grade 30 and the mineral oil solution, on being subjected to the aforesaid humidity test, gave a humidity test life of at least 500 hours; a 2.5% concentration of the same additive in the mineral oil gave a humidity test life of 1175 hours.

*Example C*

A composition was prepared by blending beta (N-diethyl) aminoethylstearate and lauryl acid phosphates in a ratio, based on equivalent weights, of 1 part of the amine to 1.25 parts of the acid ester. Another composition was prepared by reacting the same acid ester and amine in a ratio based on equivalent weights of 1 part of the amine to 1.5 parts of the acid ester. These compositions, when used in concentrations of 4.5% and 5%, respectively, in a mineral oil of SAE 30 grade and subjected to the aforesaid humidity test, gave a test life in hours of at least 1680 hours.

*Example D*

A composition was prepared by reacting beta (N-ethanol) aminodiethyloleate with lauryl acid phosphates in a ratio, based on equivalent weights, of 1 part of the amine to 1.14 parts of the acid esters. 5.12% of the reaction product dissolved in a mineral oil of SAE 30 grade gave a humidity test life of at least 1000 hours. Such a high degree of rust-preventive characteristics obtained by use of such a composition is clearly unexpected when compared to the results obtained by individual use of either of the components employed in preparation of the aforesaid composition; that is, when compared to a test life of 100–150 hours obtained by use of either a 4% concentration of beta (N-ethanol) aminodiethyloleate or 3–5% concentrations of the lauryl acid phosphates in the same oil.

*Example E*

A composition was prepared by blending beta (N-diethyl) aminoethyloleate with lauryl acid phosphates in a ratio, based on equivalent weights, of 1 part of amine to 1.12 parts of the acid esters. A 4.25% concentration of the reaction product, in a mineral oil of SAE 30 grade, gave a humidity test life of at least 1000 hours which is a markedly unexpected degree of rust-preventive characteristics as compared to a test life not exceeding about 150 hours obtained by use of either a 4% concentration of beta (N-diethyl) aminoethyl-oleate or a 5% concentration of the lauryl acid phosphates in the same base oil.

Although the present invention has been described in conjunction with certain preferred embodiments thereof, those skilled in the art will readily recognize that variation and modifications can be made. Such modifications and variations are to be considered to be within the purview of the specification and scope of the appended claims.

I claim:

1. As a new chemical compound, a substituted ammonium salt formed by an acid ester of a phosphorus acid with a mononitrogen amine containing an esterified alkylol group, said acid ester being characterized by containing a hydrocarbon group as the residue of an esterification agent for said phosphorus acid.

2. As a new composition, a compound, as defined in claim 1, in solution with an acid ester of a phosphorus acid.

3. As a new chemical compound, a substituted ammonium salt formed by an acid ester of phosphoric acid with a mononitrogen amine containing an alkylol group that has been esterified with a monobasic aliphatic acid, said acid ester being characterized by containing a hydrocarbon group as the residue of an esterification agent for said phosphoric acid.

4. As a new composition, a compound, as defined in claim 3, in solution with an acid ester of phosphoric acid.

5. As a new compound, a substituted ammonium salt formed by an acid ester of phosphoric acid with a mononitrogen amine that contains an alkylol group that has been esterified with a fatty acid of from four to thirty carbon atoms, said acid ester being characterized by containing a hydrocarbon group as the residue of an esterification agent for said phosphoric acid.

6. A compound, as defined in claim 5, wherein the acid ester is an alkyl acid ester of phosphoric acid.

7. A compound, as defined in claim 5, wherein the acid ester is an alicyclic acid ester of phosphoric acid.

8. A compound, as defined in claim 5, wherein the acid ester is an aryl acid ester of phosphoric acid.

9. A compound, as defined in claim 5, wherein the amine is a dialkyl alkylol amine in which the alkylol group has been esterified with a fatty acid of 4 to 30 carbon atoms.

10. A compound, as defined in claim 5, wherein the amine is an alkyl dialkylol amine in which at least one of the alkylol groups has been esterified with a fatty acid of 4 to 30 carbon atoms.

11. A compound, as defined in claim 5, wherein the amine is a trialkylol amine in which at least one of the alkylol groups has been esterified with a fatty acid of 4 to 30 carbon atoms.

12. As a new composition, a neutral substituted ammonium salt formed by an acid ester of a phosphorus acid with an amine containing an esterified alkylol group in admixture with an acid ester of a phosphorus acid in a ratio of one mol of said neutral salt to about 0.05 to 3 mols of said acid ester.

13. As a new chemical compound, a substituted ammonium salt formed by an acid ester of a phosphorus acid with a mononitrogen amine containing an esterified alkylol group, said acid ester being a member from the group consisting of aliphatic-, alicyclic-, aryl-, and aliphatic-substituted aryl-acid esters of a phosphorus acid and said mononitrogen amine being a member from the group consisting of dialkylalkylolamines, alkyl dialkylolamines and trialkylolamines.

14. A compound, as defined in claim 13, wherein the mononitrogen-amine contains an alkylol group esterified with a fatty acid of about 4 to about 30 carbon atoms and the acid ester contains, as the residue of an esterifying agent for said phosphorus acid, a hydrocarbon group of about 4 to about 30 carbon atoms.

15. As a new composition, a compound as defined in claim 14 in admixture with an acid ester of phosphoric acid.

JOHN W. BISHOP.

REFERENCES CITED

The following references are of record in the file of this patent:

UNITED STATES PATENTS

| Number | Name | Date |
|---|---|---|
| 2,080,299 | Benning | May 11, 1937 |
| 2,162,454 | Guthman | June 13, 1939 |
| 2,178,173 | Katzman et al. | Oct. 31, 1939 |
| 2,279,501 | Dickey et al. | Apr. 14, 1942 |
| 2,382,699 | Duncan | Aug. 14, 1945 |
| 2,413,852 | Turner | June 7, 1947 |
| 2,430,846 | Morgan | Nov. 11, 1947 |